March 30, 1954     W. W. HOFFMANN     2,673,686
PREDETERMINING COUNTER HAVING MAGNETICALLY
HELD CONTROL MEANS
Filed April 23, 1952     2 Sheets-Sheet 1
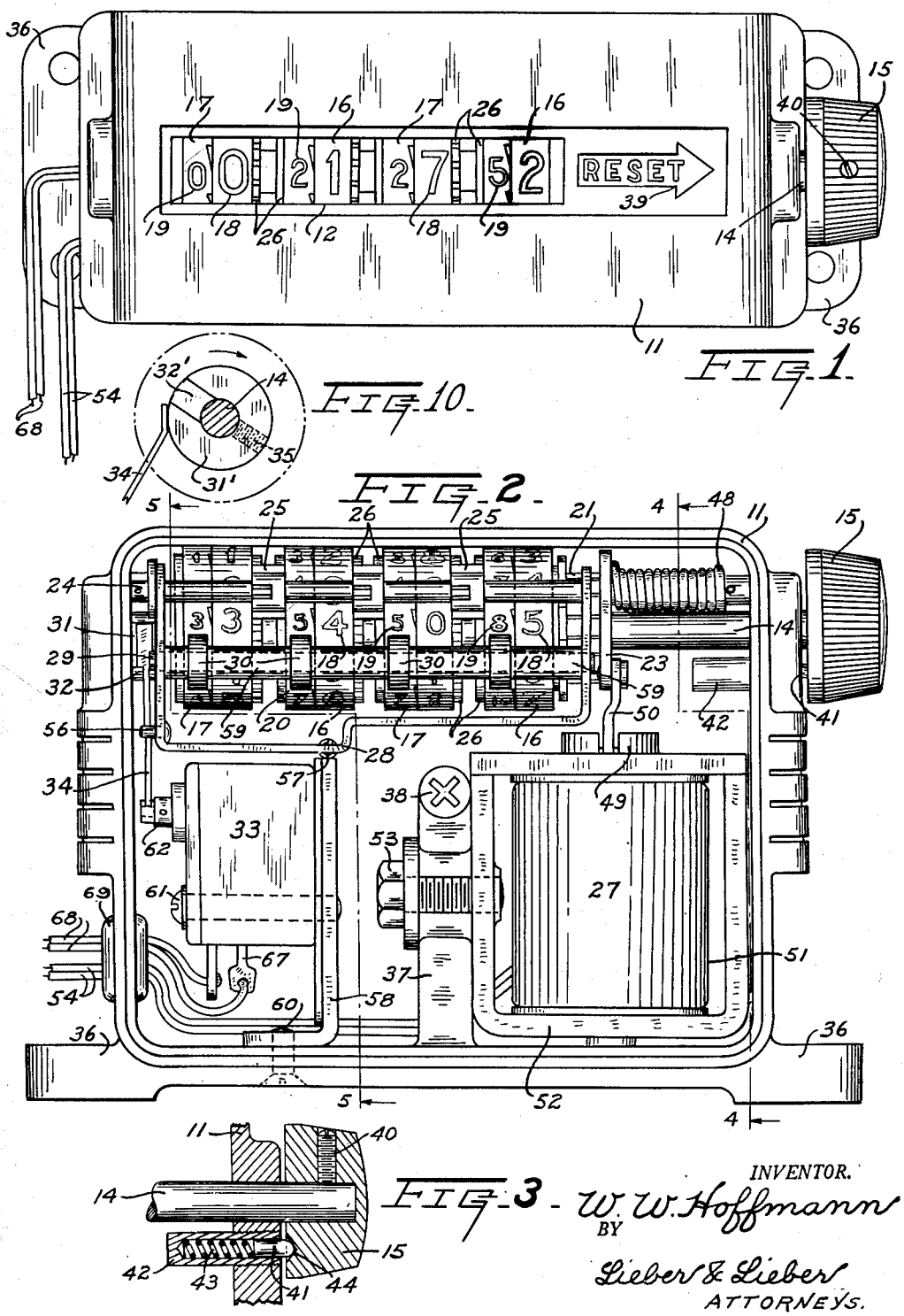
INVENTOR.
W. W. Hoffmann
BY
Lieber & Lieber
ATTORNEYS.

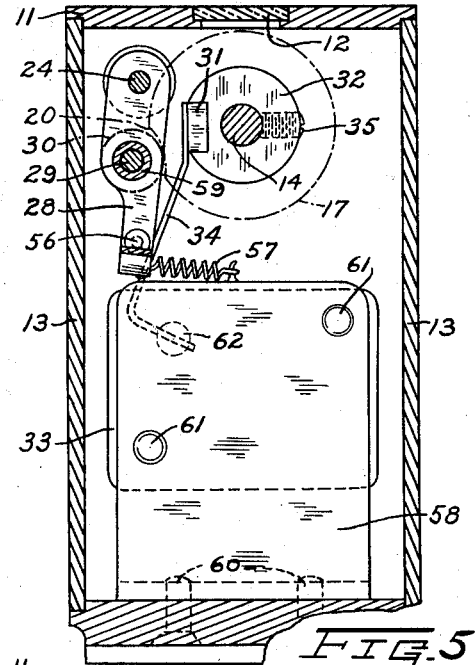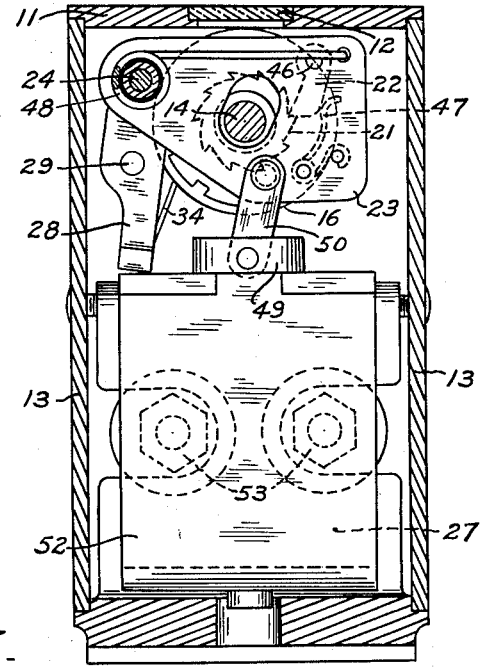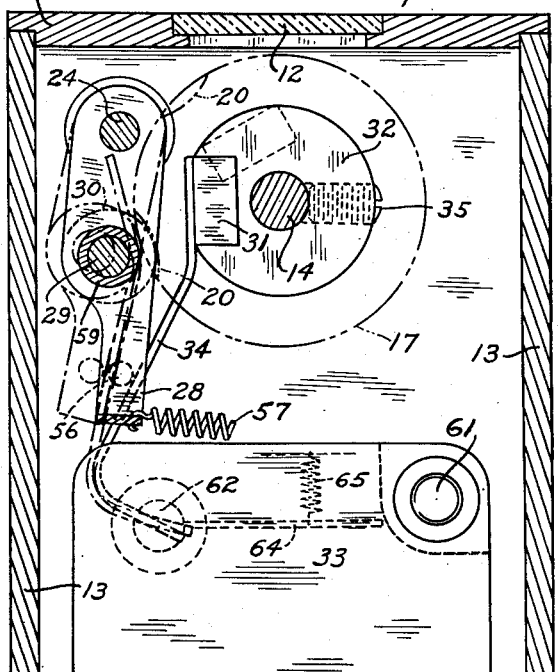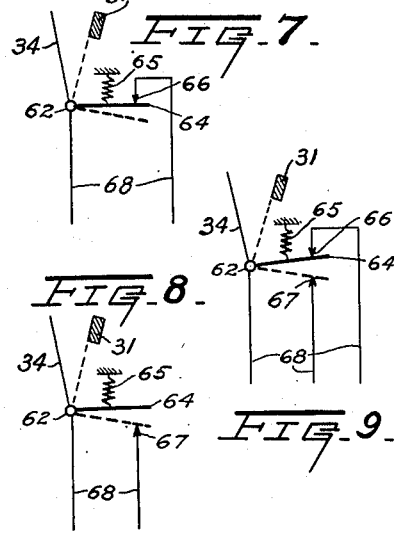

Patented Mar. 30, 1954

2,673,686

UNITED STATES PATENT OFFICE 2,673,686

PREDETERMINING COUNTER HAVING MAGNETICALLY HELD CONTROL MEANS

Walter W. Hoffmann, Waukesha County, Wis., assignor to Durant Manufacturing Co., Milwaukee, Wis., a corporation of Wisconsin Application April 23, 1952, Serial No. 283,909

4 Claims. (Cl. 235—132)

The present invention relates in general to improvements in devices for automatically counting a succession of events or operations; and relates more particularly to improvements in the construction and operation of so called predetermining counters which may be pre-set to stop the normal functioning of a machine with which the counter is associated, whenever a definite number of operations have been performed by such machine.

The primary object of my invention is to provide an improved predetermining counter which is simple and durable in construction and which is also exceedingly reliable and efficient in operation.

It has long been customary to provide machines or mechanisms such as looms or the like, with so called predetermining counters which could be pre-set to automatically stop the production of the machine upon completion of a pre-selected number of operations, and could thereafter be reset to automatically repeat the same number of operations or to subsequently halt production when a different pre-selected number of such machine operations had been performed. This type of predetermining counter is ordinarily associated with a signal such as a light or with an electric control switch for shutting off a motor or the like whenever a predetermined count has been attained; and in most cases these counters must be operable at high speed and utmost accuracy in performance thereof is also essential. While some of the prior counters of the predetermining type have been quite successful in commercial use, all of them are relatively complicated especially as to the mechanisms for actuating the signal or control switches, thus not only making the initial cost unduly high but also necessitating considerable attention and loss of time due to maintaining them in operating condition.

It is therefore an important object of the present invention to provide improved instrumentalities for actuating such a signal or switch, and for reestablishing the same whenever the counting mechanism is reset for subsequent predetermined counting operations.

Another important object of this invention is to provide simple means for automatically actuating a switch whenever a definite pre-selected number of counts have been registered by a predetermining counter, and for positively maintaining the switch in such actuated condition until the counter is reset.

A further important object of my invention is to provide an improved predetermining counter associated with an electric switch operable whenever a predetermined count has been reached, and wherein the normal counter wheels may continue to rotate after attainment of the predetermined count and may be brought back to zero reading when the switch is reversely operated.

Still another important object of the invention is to provide compact and highly reliable mechanism for transmitting motion from the predetermining numeral wheels of a high speed rotary counter to a signal or stop switch, with utmost precision and with least attention.

An additional object of my present invention is to provide a vastly simplified and improved rotary, high speed predetermining counter, which may be manufactured at moderate cost and which is adapted for diverse uses.

These and other objects and advantages of the invention will be apparent from the following detailed description, from which it will be noted that the gist of the invention is the provision of a magnet associated with the reset shaft of a rotary predetermining counter and which functions automatically to actuate an electric switch whenever a predetermined count has been attained, while also positively maintaining the switch in such actuated condition until the counter is reset for subsequent normal operation.

A clear conception of the features constituting my improvement, and of the construction and operation of a typical commercial high speed predetermining counter embodying the invention, may be had by referring to the drawings accompanying and forming a part of this specification wherein like reference characters designate the same or similar parts in the various views.

Fig. 1 is a top view of a predetermining counter having four sets of numeral wheels of successively higher order adapted to be manually reset whenever a pre-set number of counts has been effected;

Fig. 2 is a front view of the counter of Fig. 1 with the front closure plate removed to reveal the normally concealed internal mechanism;

Fig. 3 is a central vertical section through the manually operable reset knob of the counter;

Fig. 4 is a vertical section through the counter, taken along the irregular line 4—4 of Fig. 2 and looking toward the counter driving mechanism;

Fig. 5 is another vertical section through the same counter, taken along the irregular line 5—5 of Fig. 2 and showing the improved signal switch actuating mechanism together with one of the predetermining wheels and its cooperating roller in dot-and-dash lines;

Fig. 6 is an enlarged section similar to that of

Fig. 5 but showing the signal switch actuating mechanism in both active and inactive position;

Fig. 7 is a diagram showing a switch operable by the predetermining mechanism, and which is normally closed and opens when the predetermined count is reached;

Fig. 8 is a similar diagram in which the switch is normally open and closes when the predetermined number of counts has been effected;

Fig. 9 is another similar diagram wherein the switch normally closes one electric circuit and opens another when the predetermined count is attained; and Fig. 10 is a fragmentary view similar to Fig. 5, but showing a modified type of magnet.

While the invention has been shown herein as having been applied by way of illustration to a counter having an electrically actuated solenoid drive substantially similar to that forming the subject of my copending application Serial No. 208,283, filed January 29, 1951, and embodying predetermining wheels and reset mechanisms similar to those disclosed in U. S. Patent No. 2,159,314, granted May 23, 1939, it is not the intent to unnecessarily restrict the improved features to counters embodying such driving and resetting mechanisms; and it is also contemplated that specific descriptive terms employed herein be given the broadest possible interpretation consistent with the disclosure.

Referring to the drawings, the typical improved predetermining counter shown comprises in general a unitary main housing 11 having an upper sight opening 12 and front and rear detachable closure covers 13; a normally stationary reset shaft 14 journalled in and spanning the upper interior of the housing 11 and having a manually manipulable actuating knob 15 secured to one end thereof; four sets of counting wheels 16 and cooperating predetermining wheels 17 of progressively higher order normally rotatable upon the reset shaft 14, each of the counting wheels 16 having a series of peripheral numerals 18 thereon visible through the opening 12 and each of the predetermining wheels 17 being rotatably adjustable relative to its counting wheel 16 and having a like series of peripheral numerals 19 and a local peripheral notch 20 thereon; a ratchet wheel 21 also rotatable about the shaft 14 and being drivingly cooperable with the counter wheel 16 of lowest order and adapted to be intermittently rotated by a pawl 22 carried by an oscillatory plate 23 pivotally mounted upon a second shaft 24 secured to and spanning the upper interior of the housing 11 laterally of the reset shaft 14; a series of transfer pinions 25 journalled upon the fixed shaft 24 and coacting with gearing 26 on the numeral wheels 16, 17 to transmit rotary intermittent motion from the wheels of lower order to the adjoining wheels of higher order; an electric solenoid 27 confined within the housing 11 for normally oscillating the plate 23 to register successive counts; a yoke 28 swingably suspended from the pivot shaft 24 and carrying another shaft 29 having thereon rollers 30 which are cooperable with all of the notches 20 of the predetermining wheels 17 whenever a predetermined count is attained; a permanent magnet 31 carried by a disc 32 secured to the reset shaft 14; and an electric switch 33 also confined within the housing 11 and having a switch contact actuating arm 34 or armature of magnetic material cooperable with the magnet 31 whenever all of the rollers 30 enter all of the notches 20 of the predetermining wheels 17.

The main casing or housing 11 may be provided with an integral supporting base 36 and the central interior portion of the housing has an integral upright lug 37 therein to which the large front and rear covers 13 may be detachably secured by screws 38 and which also provides a support for the solenoid 27, see Figs. 2 and 4. The top of the housing 11 adjacent to the reset knob 15 may also be provided with an indicating reset arrow 39 as shown in Fig. 1, and the knurled reset shaft manipulating knob 15 is secured to the shaft 14 in proper position by a set screw 40 and is frictionally held in normal zeroizing position by means of a plug latch 41 slidably mounted in a tubular casing 42 and which is constantly urged toward the knob 15 by a spring 43 and is cooperable with a local detent 44 in the knob, as depicted in Figs. 2 and 3. The rotary counting and predetermining numeral wheels 16, 17 are of well known cooperation and construction, and there may be any number of sets of these cooperating wheels depending upon the use for which the counting unit is intended, and the construction and operation of the transfer pinions 25 and of the motion transfer gearing 26 is also well known as indicated by Patent No. 2,159,314 hereinabove referred to.

The ratchet wheel 21 which is rotatable upon the normally stationary reset shaft 14 adjacent to the counting wheel 16 of lowest order, is rotatable in one direction to effect normal counting operation of the numeral wheels by means of the mechanism shown at the right of Fig. 2 and in Fig. 4. This mechanism consists primarily of the oscillatory or reciprocatory plate 23 which is pivotally suspended from the fixed shaft 24, the pawl 22 swingably suspended from the plate 23 by a pivot pin 46 and which is constantly urged toward the teeth of the ratchet wheel 21 by a spring 47, a torsion spring 48 surrounding the shaft 24 and coacting with the housing 11 and with the plate 23 to constantly urge the latter downwardly, and a magnetic plunger or core 49 connected to the plate 23 by a link 50 and being movable upwardly whenever the coil 51 of the solenoid 27 is energized. The electric solenoid 27 may be mounted in a U-shaped frame 52 secured to the lug 37 within the lower portion of the housing 11 by means of cap screws 53, and the coil 51 is adapted to be intermittently energized by successive operations of the machine with which the counter is associated, through conductors 54.

The U-shaped yoke 28 which is swingable about the upper fixed pivot shaft 24, besides supporting the roller carrying shaft 29, also has a pin 56 projecting laterally therefrom into the path of movement of the oscillatory contact actuating arm 34, and is constantly urged inwardly toward the reset shaft 14 by a tension spring 57 connecting the lower medial portion of the yoke with the fixed supporting bracket 58 of the switch 33 which is also confined within the lower portion of the housing 11. The successive rollers 30 are spaced apart by collars 59 embracing the shaft 29, and normally ride upon the peripheries of the adjacent predetermining wheels 17 but are all simultaneously forced into the notches 20 of these wheels whenever the notches are alined as when the predetermined count has been reached, by the spring 57 which then functions to swing the yoke 28 inwardly as shown in solid lines in Figs. 5 and 6. The bracket 58 is secured within the housing 11 by screws 60 and the electric switch 33 is attached to this bracket by other screws 61, and the contact actuating arm 34 of the control switch 33 is formed of magnetic material and is pivotally attached at its lower end to the movable contact supporting pin 62, while its upper end is positively swingable toward the reset shaft 14 by the pin 56 and is reversely movable by a spring or the like associated with the switch 33.

As shown in the diagrams of Figs. 7, 8 and 9, the electric switch 33 may be either of the type adapted to open an electric circuit whenever the predetermined count is attained by the counting unit as in Fig. 7, or of the type adapted to close an electric circuit under similar conditions of operation as in Fig. 8, or of the type adapted to open one electric circuit and to close another under like operating conditions as in Fig. 9. In each case, the switch has a movable contact 64 which is swingably suspended from the same pivot pin 62 which supports the arm 34, and a spring 65 coacts with the movable contact 64 so as to constantly swing the arm 34 outwardly away from the reset shaft 14 whenever this arm is not engaged by the magnet 31. The movable contact 64 of the switch may be cooperable either with a fixed contact 66, or with a fixed contact 67, or with two fixed contacts 66, 67, and the cooperating fixed and movable contacts are electrically connected to conductors 68 which may be introduced into the housing 11 through a bushing 69 the same as the solenoid conductors 54.

When the improved predetermining counter has been properly constructed and installed, it may be utilized to operate diverse types of control switches 33, and the normal operation thereof when cooperating with a switch 33 of the type illustrated in Fig. 8 is as follows. The predetermining numeral wheels 17 should be adjusted relative to their counting wheels 16, to the count at which it is desired to have the switch 33 operate, and the counting wheels 16 should be set by rotating the shaft 14 with the aid of the knob 15 to register zero reading through the window opening 12 of the housing 11. Some of the predetermining wheels 17 will then be disposed with their peripheral notches 20 staggered or out of alinement with the notches of the others, and the movable contact 64 of the control switch 33 will then be held in open position by the spring 65 while the actuating arm 34, yoke 28, and rollers 30 will be positioned as shown in dot-and-dash lines in Fig. 6, with the arm 34 out of engagement with the magnet 31. With the counter thus preset, the latch 41 coacting with the knob 15 will hold the reset shaft 14 stationary, and the magnet 31 will be in the solid line position.

The machine with which the counting unit is associated, may then be operated to intermittently energize the solenoid winding or coil 51, and to thus alternately raise the core 49 and to thereby swing the oscillatory plate 23 and the pawl 22 upwardly about the fixed shaft 24 a distance slightly greater than the length of one tooth of the ratchet wheel 21. Whenever the solenoid is deenergized, the torsion spring 48 will quickly cause the pawl 22 to engage the adjacent ratchet wheel tooth and to swing the plate 23 downwardly, thereby causing the ratchet wheel 21 to rotate the counting wheel 16 of lowest order one tenth of a revolution and also causing the transfer pinions 25 to transmit motion to the counting wheel 16 of higher order whenever the transfer gearing 26 between the successive counting wheels becomes effective. This normal functioning of the counter will continue from the zero starting point until the predetermined count has been reached, whereupon all of the peripheral notches 20 of the several predetermining wheels 17 will be automatically advanced to a position of perfect alinement with each other.

As the notches 20 reach this alined position all of the rollers 30 carried by the shaft 29 will enter these notches, thereby enabling the tension spring 57 to immediately become effective to swing the yoke 28 inwardly and causing the pin 56 to also swing the switch contact actuating arm 34 inwardly into contact with the magnet 31 as shown in solid lines in Figs. 5 and 6. This movement of the actuating arm 34 causes the movable switch contact 64 to quickly move into closed position as illustrated in dotted lines in Fig. 8, thereby completing the electric circuit through the control switch 33. The permanent magnet 31 will thereafter positively hold the switch lever 34 until the counting wheels 16 are reset to zero reading by subsequent manipulation of the knob 15 and reset shaft 14, in order to start a new series of predetermined counts; and when such resetting is being effected the notches 20 of the wheels 17 will again be staggered so as to swing the rollers 30 and the yoke 28 and the arm 34 outwardly while the magnet 31 will be returned to active position.

While the non-magnetic disc 32 of Figs. 5 and 6 will release the arm 34 the moment the shaft 14 is turned, the magnet 31' and disc 32' may be formed as in Fig. 10 so as to hold the arm 34 inwardly until after the shaft 14 has been turned a complete revolution to complete the resetting operation.

It is to be noted that regardless of the type of switch 33 utilized in the unit, the functioning of the magnet 31 and actuating arm 34 is the same except for variations in the operation and use of the control switch 33, and in each case the numeral wheels 16, 17 may be permitted to rotate beyond the predetermined count in order to enable the operation of the controlled machine to stop gradually. However, whenever a predetermined count has been attained, the powerful magnet 31 will positively hold the contact actuating arm 34 inwardly thereagainst and will thus maintain the movable switch contact 64 in the desired thrown position, until the counter is reset and the magnet 31 is manually displaced or rotated by the disc 32 and reset shaft 14 out of engagement with the arm 34. When such resetting takes place, the arm 34 will immediately swing outwardly to the position shown in dot-and-dash lines in Fig. 6, and the yoke 28 and rollers 30 may even have been previously moved to such position by the coasting of the machine.

From the foregoing detailed description it will be apparent that the present invention in fact provides an improved predetermining counter unit which is dependably operable at high speed to actuate various types of control devices such as electric switches 33. By mounting both the actuating solenoid 27 and the control switch 33 within the common housing 11, an exceedingly compact and safely operable electric counter results, and all of the mechanism is thoroughly protected against damage and unauthorized tampering. The use of the permanent magnet 31 cooperating with the magnetic switch actuating arm 34, affords exceedingly simple but reliable means for actuating the control switch whenever a predetermined count has been reached, and for positively holding the switch contacts in thrown position while still permitting rotation of the counter wheels 16, 17. The control switch 33 of the improved unit may however be readily returned to normal condition by merely resetting the counter for normal operation, and the counting unit is obviously flexible in its adaptations and may be utilized for diverse purposes.

The provision of the latch 41 coacting with the manually operable reset knob 15 is also important as it not only gives the operator an indication as to when proper resetting has been accomplished, but it also positively holds the reset shaft 14 in the desired position. The set screw 40 serves to permit relative adjustment of the knob 15 and shaft 14, while another set screw 35 provides for similar adjustment of the disc 32 and magnet 31 relative to the reset shaft 14. Accurate performance of the counting and switch actuating mechanism is thus assured, and the improved device has proven highly satisfactory and successful in actual use.

It should be understood that it is not desired to limit this invention to the exact details of construction and operation of the counting unit herein specifically shown and described, for various modifications within the scope of the appended claims may occur to persons skilled in the art.

I claim:

1. In a predetermining counter, a succession of counting wheels of progressively higher order each having a series of peripheral numerals, a like succession of predetermining wheels each having an independent series of peripheral numerals and each normally being rotatable with one of said counting wheels but also being rotatably adjustable relative to the adjacent numeral wheel, a normally stationary reset shaft rotatably supporting all of said wheels, a magnet associated with said shaft and being movable thereby only during resetting of said wheels, a switch having a contact actuating arm movable in opposite directions, and means operable by said predetermining wheels to move said arm into engagement with said magnet to hold the same whenever all of said predetermining wheels reach a definite position, said switch contact actuating arm being movable in the opposite direction away from said magnet only when said shaft is manipulated to reset said wheels.

2. In a predetermining counter, a succession of counting wheels of progressively higher order each having a series of peripheral numerals, a predetermining wheel carried by and rotatably adjustable relative to each of said counting wheels, a normally stationary reset shaft rotatably supporting all of said wheels, an electric switch having a contact actuating arm movable in one direction, means operable by said predetermining wheels to move said arm in said one direction whenever all of said predetermining wheels reach a preselected position, a permanent magnet cooperable with said contact actuating arm to hold the switch in a definite position when the arm has been moved in said one direction, and means operable by said shaft for releasing said contact actuating arm from said magnet and for moving the arm in the opposite direction only when said shaft is rotated to reset said wheels.

3. In a predetermining counter, a succession of counting wheels of progressively higher order each having a series of peripheral numerals, a predetermining wheel carried by and rotatably adjustable relative to each of said counting wheels, a normally stationary reset shaft rotatably supporting all of said wheels, an electric switch having a contact actuating arm movable in opposite directions, means operable by said predetermining wheels to move said arm in one direction whenever all of the predetermining wheels reach a preselected position, a permanent magnet engageable with said contact actuating arm to hold said switch in a definite position when the arm has been moved in said one direction, and means for releasing said contact actuating arm from said magnet and for moving the arm in the opposite direction only when said shaft has been rotated to substantially reset all of said wheels.

4. In a predetermining counter, a succession of numeral wheels of progressively higher order, a predetermining wheel rotatably adjustable relative to each of said numeral wheels, a normally stationary reset shaft about which said wheels are rotatable during counting operation, a switch having a contact movable in opposite directions, means operable by said predetermining wheels to move said switch contact in one direction whenever all of the predetermining wheels reach a preselected position, a magnet cooperable with said switch contact to hold the same in a definite position when the contact has been moved in said one direction, and means for releasing said contact from cooperation with said magnet and for moving the contact in the opposite direction only when said shaft is rotated to reset said wheels.

WALTER W. HOFFMANN.

References Cited in the file of this patent

UNITED STATES PATENTS

| Number | Name | Date |
|---|---|---|
| 2,159,314 | Bliss | May 23, 1939 |
| 2,178,839 | Landon | Nov. 7, 1939 |
| 2,448,779 | Crise | Sept. 7, 1948 |
| 2,581,859 | Hoye | Jan. 8, 1952 |